US010774764B2

(12) United States Patent
Hanawa et al.

(10) Patent No.: US 10,774,764 B2
(45) Date of Patent: Sep. 15, 2020

(54) FUEL INJECTION CONTROL INFORMATION GENERATION DEVICE AND CONTROL DEVICE

(71) Applicants: ISUZU MOTORS LIMITED, Tokyo (JP); TRANSTRON Inc., Kanagawa (JP)

(72) Inventors: Satoshi Hanawa, Fujisawa (JP); Hidekazu Fujie, Yamato (JP); Yoshiaki Ikai, Fujisawa (JP); Takuma Degawa, Yokosuka (JP)

(73) Assignees: ISUZU MOTORS LIMITED, Tokyo (JP); TRANSTRON INC., Yokohama-shi (JP)

( * ) Notice: Subject to any disclaimer, the term of this patent is extended or adjusted under 35 U.S.C. 154(b) by 0 days.

(21) Appl. No.: 16/466,652

(22) PCT Filed: Dec. 4, 2017

(86) PCT No.: PCT/JP2017/043520

§ 371 (c)(1),
(2) Date: Jun. 5, 2019

(87) PCT Pub. No.: WO2018/105567

PCT Pub. Date: Jun. 14, 2018

(65) Prior Publication Data

US 2019/0383223 A1 Dec. 19, 2019

(30) Foreign Application Priority Data

Dec. 5, 2016 (JP) ................................ 2016-235921

(51) Int. Cl.
*F02D 41/04* (2006.01)
*F02D 41/18* (2006.01)
*F02D 41/38* (2006.01)

(52) U.S. Cl.
CPC .......... *F02D 41/04* (2013.01); *F02D 41/182* (2013.01); *F02D 2041/389* (2013.01)

(58) Field of Classification Search
CPC .......... F02D 2041/389; F02D 2200/04; F02D 2200/0614; F02D 2200/101;
(Continued)

(56) References Cited

U.S. PATENT DOCUMENTS 6,109,224 A * 8/2000 Morikawa ................ F01L 1/34
123/90.15
6,725,148 B1 4/2004 Ted
(Continued)

FOREIGN PATENT DOCUMENTS

DE 10154516 A1 8/2002
EP 1387067 A2 2/2004
(Continued)

OTHER PUBLICATIONS

Extended European Search Report from EP Application No. 17877703.3 dated Oct. 11, 2019, 10 pages.
(Continued)

*Primary Examiner* — Hai H Huynh
*Assistant Examiner* — Diem T Tran
(74) *Attorney, Agent, or Firm* — Brundidge & Stanger, P.C.

(57) ABSTRACT

In order to adequately suppress both an increase in NOx emission amount and deterioration of fuel consumption rate, the present invention provides a fuel injection control information generation device equipped with: a test point information storage unit for holding test point information including a plurality of test points constituted by sets of engine speed, fuel injection amount, and oxygen concentration; and a control information generation unit for generating, for each test point included in the test point information, fuel injection control information in which the engine speed, fuel injection amount, and oxygen concentration of the test point are associated with an optimum fuel injection timing at which an index pertaining to the total of a fuel consumption rate and an NOx emission amount in the test point becomes the smallest.

6 Claims, 10 Drawing Sheets

(58) Field of Classification Search
CPC .... F02D 2250/36; F02D 41/04; F02D 41/107; F02D 41/1406; F02D 41/144; F02D 41/18; F02D 41/182; F02D 41/2432; F02D 41/401
See application file for complete search history.

(56) References Cited

U.S. PATENT DOCUMENTS

| | | | | |
|---|---|---|---|---|
| 2004/0117105 | A1* | 6/2004 | Harada | F02D 41/1406 701/114 |
| 2009/0222245 | A1 | 9/2009 | Hashimoto et al. | |
| 2013/0213352 | A1 | 8/2013 | Kumar | |

FOREIGN PATENT DOCUMENTS

| | | | |
|---|---|---|---|
| JP | 2002-004912 | A | 1/2002 |
| JP | 2009-150280 | A | 7/2009 |
| JP | 2009-167836 | A | 7/2009 |
| JP | 2009-205639 | A | 9/2009 |
| JP | 2010-138864 | A | 6/2010 |
| JP | 2010-271801 | A | 12/2010 |
| JP | 2015-190371 | A | 11/2015 |
| JP | 2016-008505 | A | 1/2016 |

OTHER PUBLICATIONS

International Search Report from International Application No. PCT/JP2017/043520 dated Jan. 16, 2018.

* cited by examiner

FUEL INJECTION CONTROL INFORMATION GENERATION DEVICE AND CONTROL DEVICE

TECHNICAL FIELD

The present disclosure relates to a fuel injection control information generation apparatus, and a control apparatus.

BACKGROUND ART

In recent years, there has been a demand for achieving both reduction in a nitrogen oxide (referred to as "NOx") emission amount and improvement of a fuel consumption rate. PTL 1 discloses that when fuel injection timing (referred to as "SOI (Start Of Injection)") is retarded, and a combustion temperature in a cylinder of an engine is lowered, an NOx emission amount is reduced, but when SOI is retarded, the fuel consumption rate is deteriorated, that is, the NOx emission amount and the fuel consumption rate are in a trade-off relationship with respect to change of the SOI.

CITATION LIST

Patent Literature

PTL 1
Japanese Patent Application Laid-Open No. 2010-271801

SUMMARY OF INVENTION

Technical Problem

As described above, the NOx emission amount and the fuel consumption rate are in the trade-off relationship with respect to the change of SOI. Therefore, adequate suppression of both increase in an NOx emission amount and deterioration of a fuel consumption rate is required.

An object of the present disclosure is to adequately suppress both the increase in the NOx emission amount and the deterioration of the fuel consumption rate.

Solution to Problem

A fuel injection control information generation apparatus according to one embodiment of the present disclosure includes: a test point information storage section that holds test point information including a plurality of test points constituted of a set of an engine speed, a fuel injection amount, and oxygen concentration; and a control information generation section that generates, for each of the test points included in the test point information, fuel injection control information in which the engine speed, the fuel injection amount, and the oxygen concentration at the test point are associated with an optimum fuel injection timing at which an index pertaining to a total amount of a fuel consumption rate and an NOx emission amount at the test point reaches the smallest.

A control apparatus according to one embodiment of the present disclosure includes: a control information storage section that holds the fuel injection control information generated by the fuel injection control information generation apparatus described above; and a control section that controls a fuel injection timing of an internal-combustion engine on the basis of the fuel injection control information.

Advantageous Effects of Invention

According to the present disclosure, it is possible to adequately suppress both increase in an NOx emission amount and deterioration of a fuel consumption rate.

DESCRIPTION OF EMBODIMENTS

Figure 1:
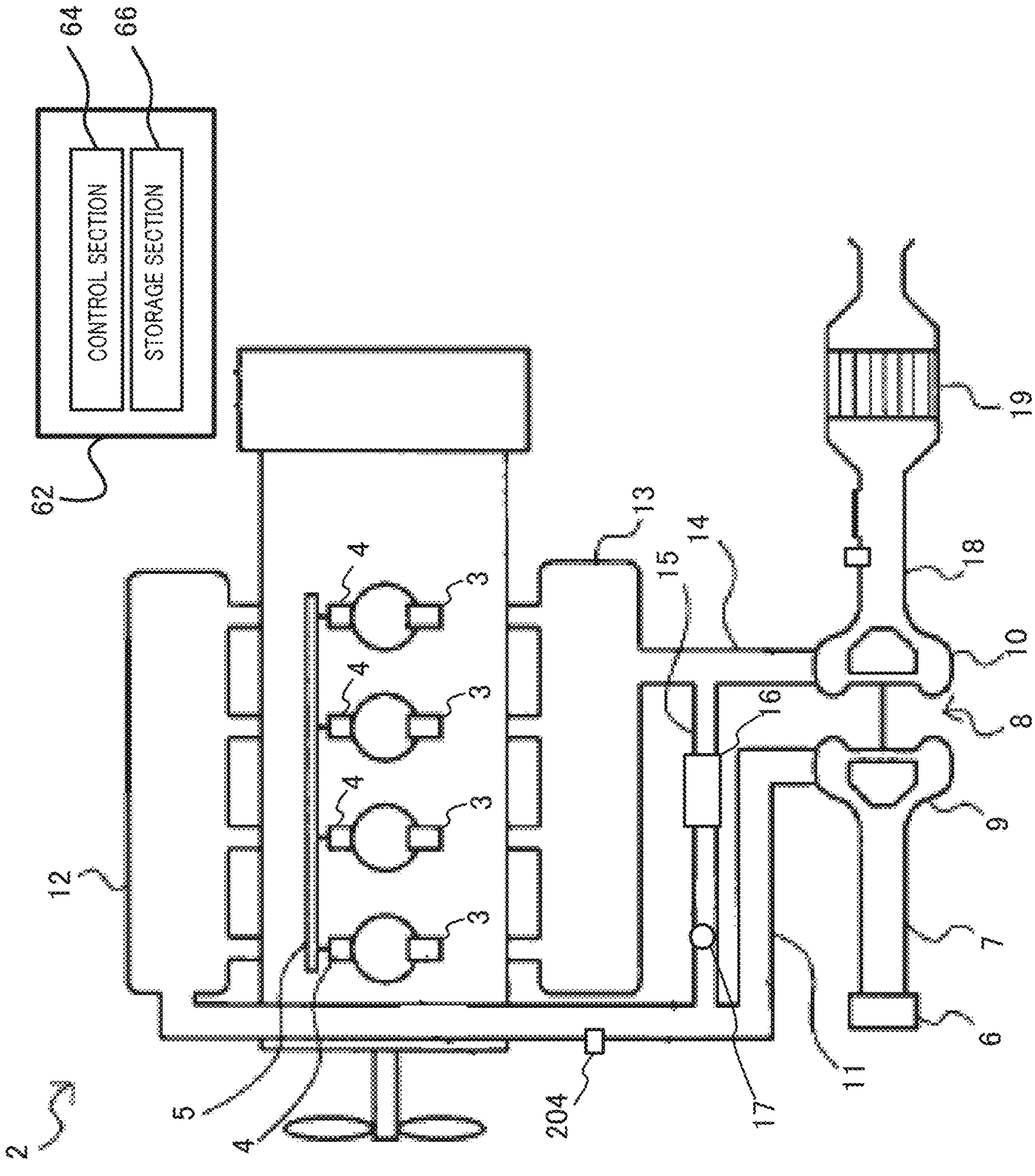
FIG. 1 is a diagram illustrating a configuration example of an engine and an ECU according to an embodiment.

Hereinafter, an embodiment according to the present disclosure will be described with reference to the accompanying drawings. In the following description, in a case in which the same kind of components are distinguished in the description, reference numerals are used like "SOI control information 120A", and "SOI control information 120B", and in a case in which the same kind of components are described without being distinguished, only common numerals among reference numerals may be used like "SOI control information 120".

FIG. 1 is a diagram illustrating a configuration example of engine 2 and ECU 62 according to an embodiment.

First, engine 2 will be described.

Engine 2 is a diesel engine having four cylinders 3. Engine 2 may be a multiple cylinder engine other than 4 cylinders, or may be a single cylinder engine.

Injectors (also referred to as a fuel injection valve) 4 are associated with respective cylinders 3, and inject fuel supplied from common rail 5 into respective combustion chambers of cylinders 3.

To air filter 6, an upstream end of intake pipe 7 is connected. A downstream end of intake pipe 7 is connected to an inlet of compressor 9 of turbocharger 8. High-pressure side intake pipe 11 is connected to an outlet of compressor 9. High-pressure side intake pipe 11 is connected to a downstream end of EGR pipe 15. High-pressure side intake pipe 11 is connected to intake manifold 12.

With such a configuration, air from atmosphere taken from air filter 6 (hereinafter, referred to as intake air) is compressed by compressor 9 through intake pipe 7 into high-pressure intake air. Then, intake air that flows into high-pressure side intake pipe 11 from compressor 9 is mixed with EGR gas from EGR pipe 15. This fuel-air mixture is hereinafter referred to as "working gas". The working gas flows into the respective combustion chambers of cylinders 3 through intake manifold 12.

High-pressure side exhaust pipe 14 is connected to exhaust manifold 13. EGR pipe 15 is connected to high-pressure side exhaust pipe 14. EGR cooler 16 that cools EGR gas, and EGR valve 17 that adjusts a flow rate of EGR gas flowing into high-pressure side intake pipe 11 are provided in EGR pipe 15. In this embodiment, the "flow rate" means a mass flow rate.

An inlet of turbine 10 of turbocharger 8 is connected to high-pressure side exhaust pipe 14. Exhaust pipe 18 is connected to an outlet of turbine 10. Exhaust gas purification apparatus 19 is installed in exhaust pipe 18.

With such a configuration, exhaust gas from each of the combustion chambers of cylinders 3 flows into high-pressure side exhaust pipe 14 from exhaust manifold 13. A part of this exhaust gas (EGR gas) flows into high-pressure side intake pipe 11 through EGR pipe 15. On the other hand, exhaust gas that flows into turbine 10 passes through exhaust pipe 18 into exhaust gas purification apparatus 19. Exhaust gas purified by exhaust gas purification apparatus 19 is exhausted outside a vehicle.

Intake oxygen concentration sensor 204 that detects oxygen concentration of intake air is provided in intake pipe 7. An installation place of intake oxygen concentration sensor 204 is not limited to an installation place illustrated in FIG. 1.

A detection result of intake oxygen concentration sensor 204 is output to ECU 62.

Thus, engine 2 is described.

Now, ECU 62 will be described.

ECU 62 has control section 64 and storage section 66. ECU 62 has, for example, a CPU (Central Processing Unit) that is an example of control section 64, a storage medium such as a ROM (Read Only Memory) storing a control program and various data, a working memory such as a RAM (Random Access Memory) that are an example of storage section 66, and an input/output port. Details of ECU 62 will be described below (refer to FIG. 9).

Figure 2:
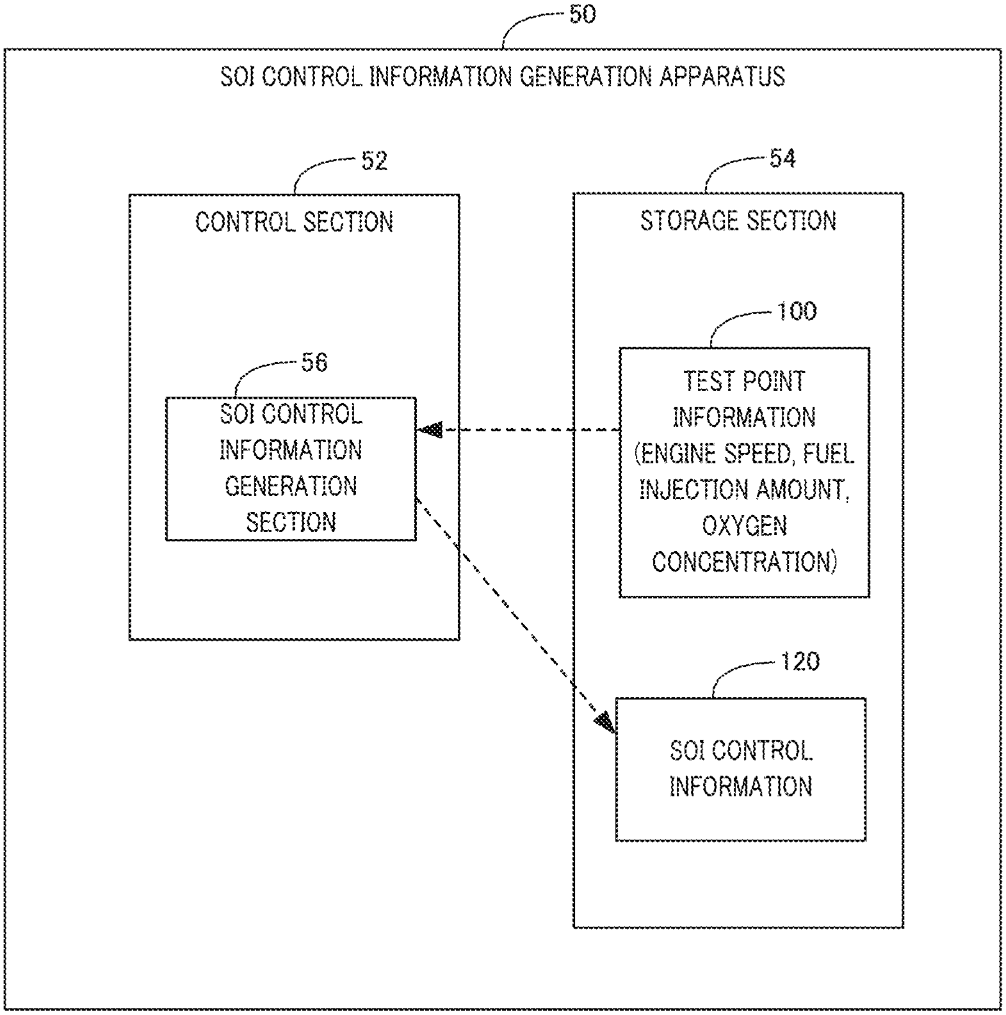
FIG. 2 is a diagram illustrating a configuration example of a fuel injection control information generation apparatus according to the embodiment.

FIG. 2 is a diagram illustrating a configuration example of fuel injection control information generation apparatus 50 according to the embodiment Fuel injection control information generation apparatus (hereinafter, referred to as a "SOI control information generation apparatus") 50 is an apparatus for generating fuel injection control information (hereinafter, referred to as "SOI control information") 120.

SOI control information generation apparatus 50 includes control section 52 and storage section 54. Control section 52 is, for example, a CPU. The storage section is, for example, a volatile or nonvolatile memory device, and/or a storage device.

Storage section 54 holds test point information 100.

Test point information 100 has a plurality of test points constituted of a set of an engine speed, a fuel injection amount, and oxygen concentration. The constitution of each test point is not limited to this, and may be, for example, a set of an engine speed and a fuel injection amount, or may be a set further including another kind of information.

Control section 52 includes SOI control information generation section 56. SOI control information generation section 56 generates fuel injection control information (referred to as "SOI control information") 120 for each test point included in test point information 100, fuel injection control information 120 being obtained by associating an engine speed, a fuel injection amount, and oxygen concentration at each test point with fuel injection timing at which an index pertaining to a total amount of a fuel consumption rate and an NOx emission amount is the smallest (referred to as "optimum SOI") at the test point. SOI control information generation section 56 may be a computer program.

SOI control information 120 is used in ECU 62. ECU 62 determines fuel injection timing on the basis of this SOI control information 120, so that both increase in the NOx emission amount and deterioration of the fuel consumption rate are adequately suppressed.

Details of the optimum SOI will be described in FIG. 3 described below. A method for calculating the optimum SOI will be described below. Details of a process of SOI control information generation section 56 will be described in FIG. 4 described below. Details of SOI control information 120 will be described in FIG. 7 or FIG. 8 described below.

Figure 3:
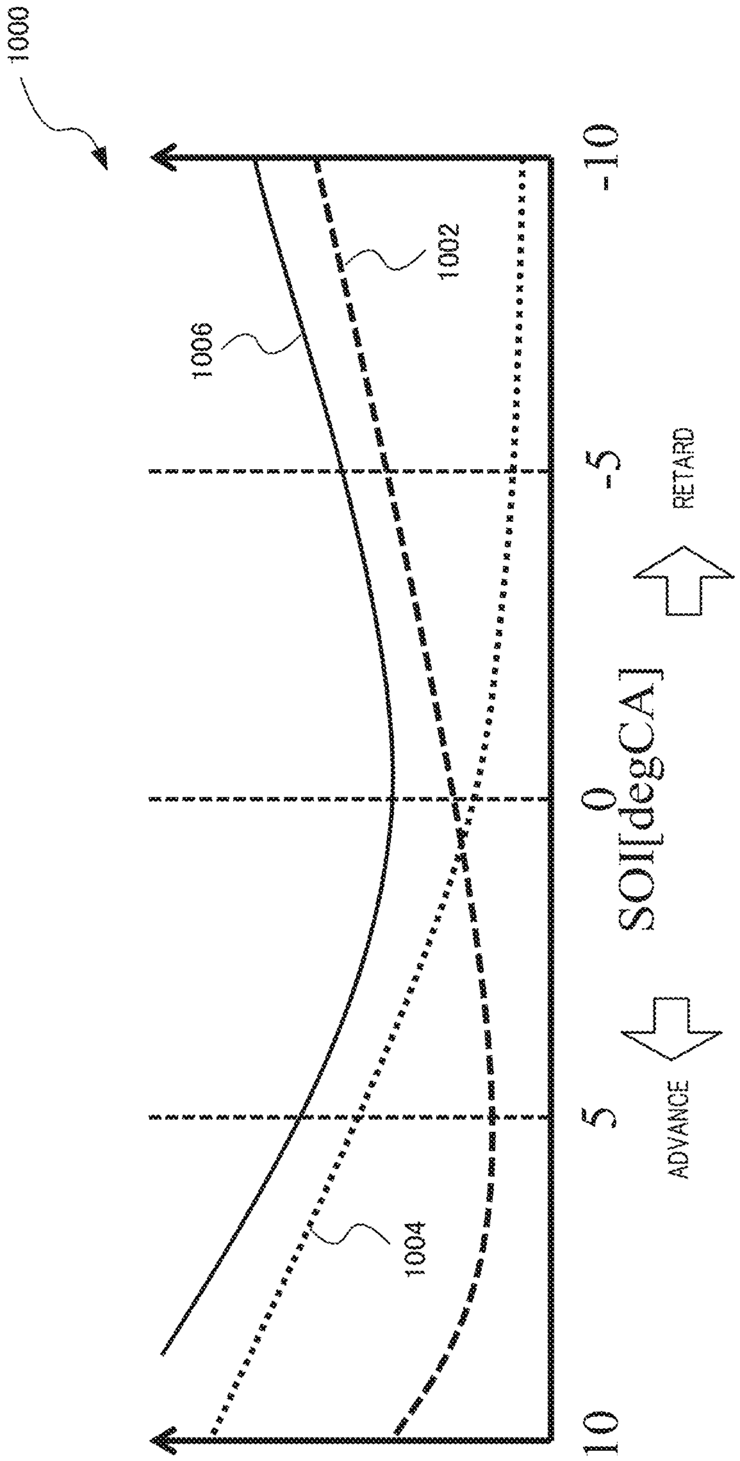
FIG. 3 is a diagram for illustrating optimum SOI.

FIG. 3 is a diagram for illustrating the optimum SOL

As illustrated in graph 1000 of FIG. 3, the NOx emission amount and the fuel consumption rate are in the trade-off relationship that when the SOI is retarded, while NOx emission amount 1004 decreases, fuel consumption rate 1002 increases (deteriorates), and when the SOI is advanced, while fuel consumption rate 1002 decreases (improves), the NOx emission amount increases. A unit of a value of the SOI is a crank angle (deg CA).

Index 1006 of FIG. 3 is a value pertaining to a total amount of fuel consumption rate 1002 and NOx emission amount 1004 when the SOI is changed. The optimum SOI is SOI at which this index 1006 is the smallest. Therefore, fuel is injected at the optimum SOI, so that it is possible to minimize the total amount of fuel consumption rate 1002 and NOx emission amount 1004. In other words, it is possible to adequately suppress both increase of an NOx emission amount and deterioration of a fuel consumption rate.

Now, the method for calculating the optimum SOI will be described.

The optimum SOI can be expressed like the following expression 1.

$$\min_{SOI}\{C \cdot NOx + (1 - C) \cdot FC\} \qquad [1]$$

In the expression, the "NOx" of expression 1 is a model expression of NOx emission, the "FC" is a model expression of a fuel consumption rate, and the "C" is a predetermined coefficient. As described in FIG. 3, expression 1 is a calculation expression of the optimum SOI at which the index pertaining to the total amount of the fuel consumption rate and the NOx emission amount is the smallest.

Expression 1 can be replaced with a differential equation of the SOI as expressed in the following expression 2.

$$C \cdot \frac{dNOx}{dsoi_{act}} + (1 - C) \cdot \frac{dFC}{dsoi_{act}} = 0 \qquad [2]$$

That is, to obtain variable $SOI_{act}$ that satisfies expression 2 is to calculate the optimum SOI.

The following expression 3 is an expression obtained by differentiating the model expression of the NOx emission with respect to the variable $SOI_{act}$.

$$\frac{dNOx}{dsoi_{act}} = NOx_{ref} \times \left(\frac{\psi_{oz}}{\psi_{oz,ref}}\right)^{\alpha\_oz} \times \qquad [3]$$

-continued $$\{\beta_{rail}\times(P_{rail}-P_{rail,ref})+1\}\times\{\beta_{clt}\times(T_{clt}-T_{clt,ref})+1\}\times$$
$$\left\{\left(\frac{T_{inm}}{T_{inm,ref}}\right)^{\alpha_{inm}}\right\}\times\left\{\beta_{soi}\times e^{(\beta_{soi}\times soi_{act}-\beta_{soi}\times soi_{ref})}\right\}$$

In the expression, the "$NOx_{ref}$" denotes an NOx reference value, the "$\Psi_{O2}$" denotes oxygen concentration, the "$\Psi_{O2,ref}$" denotes an oxygen concentration reference value, the "$SOI_{act}$" denotes a SOI value, the "$SOI_{ref}$" denotes a SOI reference value, the "$P_{rail}$" denotes common rail pressure, the "$f_{rail,ref}$" denotes a common rail pressure reference value, the "$T_{clk}$" denotes a water temperature value, the "$T_{clr,\ ref}$" denotes a water temperature reference value, the "$T_{inm}$" denotes an intake manifold temperature value, the "$T_{inm,\ ref}$" denotes an intake manifold temperature reference value, the "$\alpha_{\_O2}$" and the "$\alpha_{inm}$" each denote an exponent term (parameter), and the "$\beta_{soi}$", the "$\beta_{rail}$" and the "$\beta_{clt}$" each denote a coefficient.

The following expression 4 is an expression obtained by differentiating a model expression (torque model expression) of fuel consumption with respect to the variable $SOI_{act}$.

$$\frac{dFC}{dsoi_{act}}=\frac{m_{fuel}\times 60}{Ne\times 2\pi\times 10^{-2}}\times\frac{-1}{(T_{ref}+\Delta T_{sot})^2}\times\frac{d(\Delta T_{soi})}{dsoi_{act}} \quad [4]$$

Herein, the "$m_{fuel}$" denotes a fuel flow rate value, the "$T_{ref}$" denotes a reference torque value, the "$\Delta T_{soi}$" denotes a torque change value with respect to SOI change, and the "Ne" denotes an engine speed.

In expression 3 and expression 4, when values are substituted in respective variables other than the variable $SOI_{act}$, and these are substituted in expression 2, the variable $SOI_{act}$ can be calculated. This calculated variable $SOI_{act}$ reaches the optimum SOI to the values substituted in the respective variables of expression 3 and expression 4.

SOI control information generation section 56 calculates optimum SOI by changing the value of each variable, and associates the value of each variable at this time with the calculated optimum SOI to generate SOI control information 120. At least one of the variables corresponds to at least one of the engine speed, the fuel injection amount, and the oxygen concentration. The value of a variable other than the above may be a value determined with determination of at least one of the engine speed, the fuel injection amount and the oxygen concentration, or may be a value measured in a test run, simulation or the like.

Figure 4:
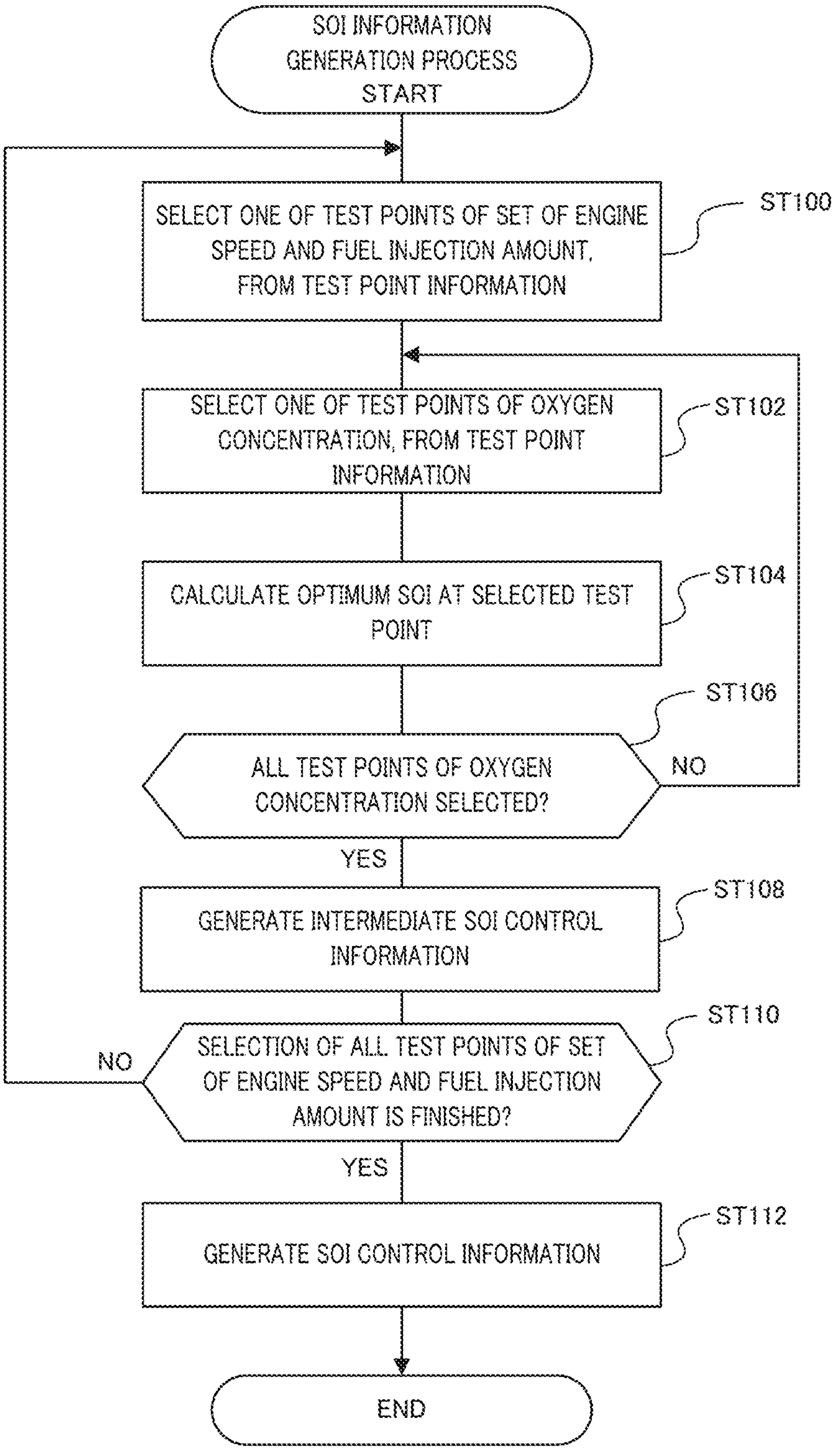
FIG. 4 is a flowchart illustrating a process example of a SOI control information generation section.

FIG. 4 is a flowchart illustrating a process example of SOI control information generation section 56.

Figure 5:
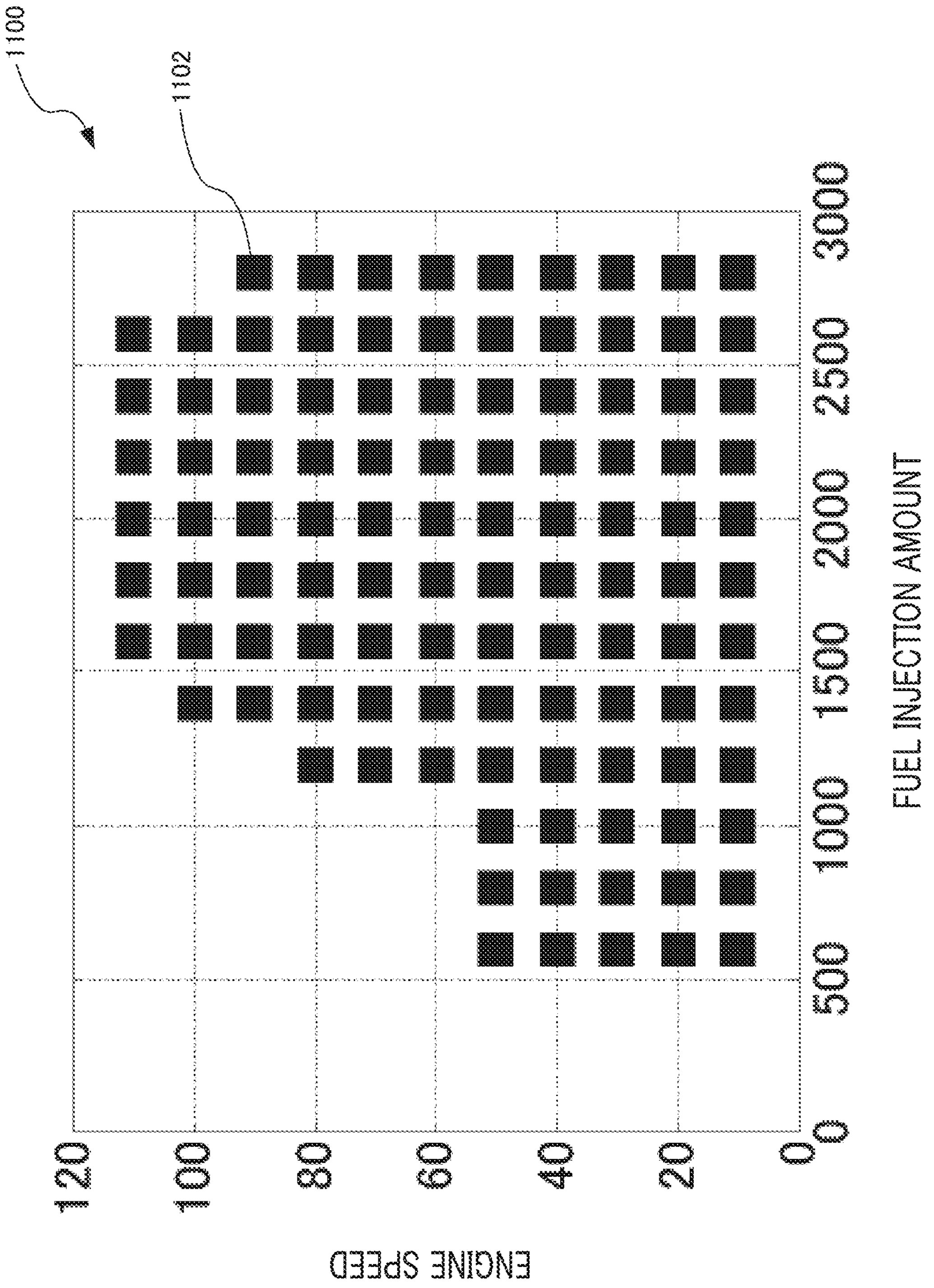
FIG. 5 is a diagram illustrating an example of a test point of a set of an engine speed and a fuel injection amount.

In ST100, SOI control information generation section 56 selects one of test points of a set of the engine speed and the fuel injection amount, from test point information 100. Test point information 100 includes a plurality of test points 1102 of an obtainable set of the engine speed and the fuel injection amount, as illustrated in graph 1100 of FIG. 5. The obtainable set is a set that can be actually generated during vehicle running. In other words, test point information 100 does not include a set that cannot be generated during vehicle running, for example, a set in which the fuel injection amount is extremely small, and/or a set in which the engine speed is extremely large.

In ST102, SOI control information generation section 56 selects one of test points of oxygen concentration, from test point information 100. Similarly to the above, test point information 100 includes a plurality of test points of obtainable oxygen concentration.

In ST104, SOI control information generation section 56 calculates optimum SOI for the test point of the set of the engine speed and the fuel injection amount selected in ST100, and the test point of the oxygen concentration selected in ST102, on the basis of the above expressions. SOI control information generation section 56 may substitute a value different for each set of the engine speed and the fuel injection amount selected in ST100 in the coefficient "C" of expression 2.

In ST106, SOI control information generation section 56 determines whether or not selection of all obtainable test points of the oxygen concentration is finished in ST102 to the test point selected in ST100.

In a case in which an unselected test point of the oxygen concentration remains (ST106: NO), SOI control information generation section 56 returns to ST102, and selects one of the remaining test points of the oxygen concentration.

In a case in which selection of all the test points of the oxygen concentration is finished (ST106: YES), SOI control information generation section 56 generates intermediate SOI control information 1200 illustrated in FIG. 6 in ST108. Intermediate SOI control information 1200 is information indicating change of optimum SOI when a test point of oxygen concentration is changed at the test point of the engine speed and the fuel injection amount selected in ST100.

Intermediate SOI control information 1200 may be information in which the test point of oxygen concentration is associated with the optimum SOI in a one-to-one manner, or may be information of a function that expresses the change of the optimum SOI to the change of the test point of the oxygen concentration.

In ST110, SOI control information generation section 56 determines whether or not selection of all the obtainable test points of the set is finished in ST100.

In a case in which a test point of an unselected set remains (ST110: NO), SOI control information generation section 56 returns to ST100, and selects one of the test point of the remaining set.

In a case in which the selection of the test points of all sets are finished (ST110: YES), SOI control information generation section 56 generates SOI control information 120 illustrated in FIG. 7 or FIG. 8 described below, on the basis of a plurality of pieces of intermediate SOI control information 1200 generated in ST108, in ST112, and this process is finished.

With the above processes, SOI control information 120 illustrated in FIG. 7 or FIG. 8 described below is generated.

Figure 7:
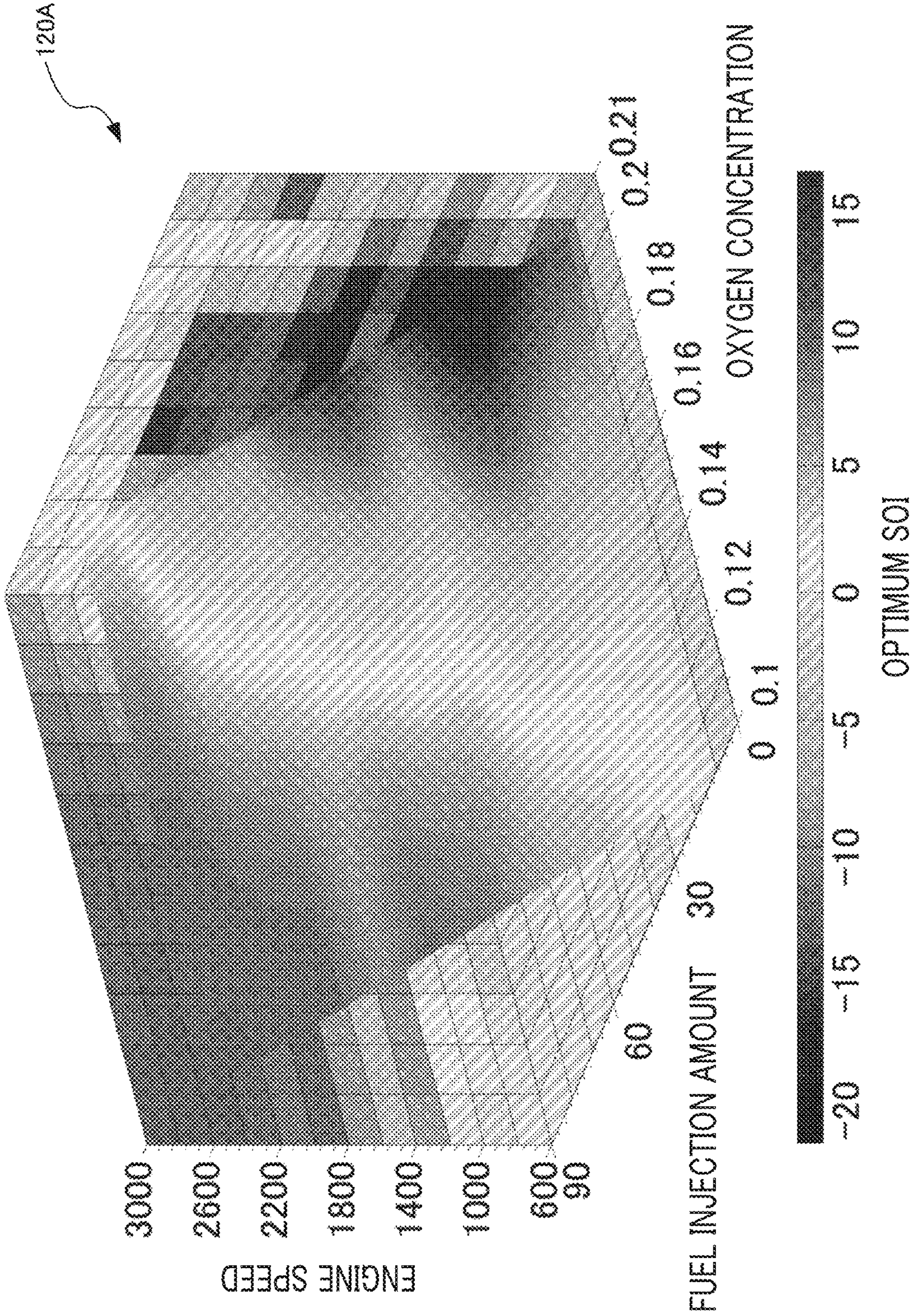
FIG. 7 is a diagram illustrating an example of SOI control information.

FIG. 7 is a diagram illustrating an example of SOI control information 120.

SOI control information 120A of FIG. 7 is a three-dimensional map information in which a plurality of the optimum SOI are associated with a plurality of the test points that are the sets of the fuel injection amount, the engine speed and the oxygen concentration.

Figure 6:
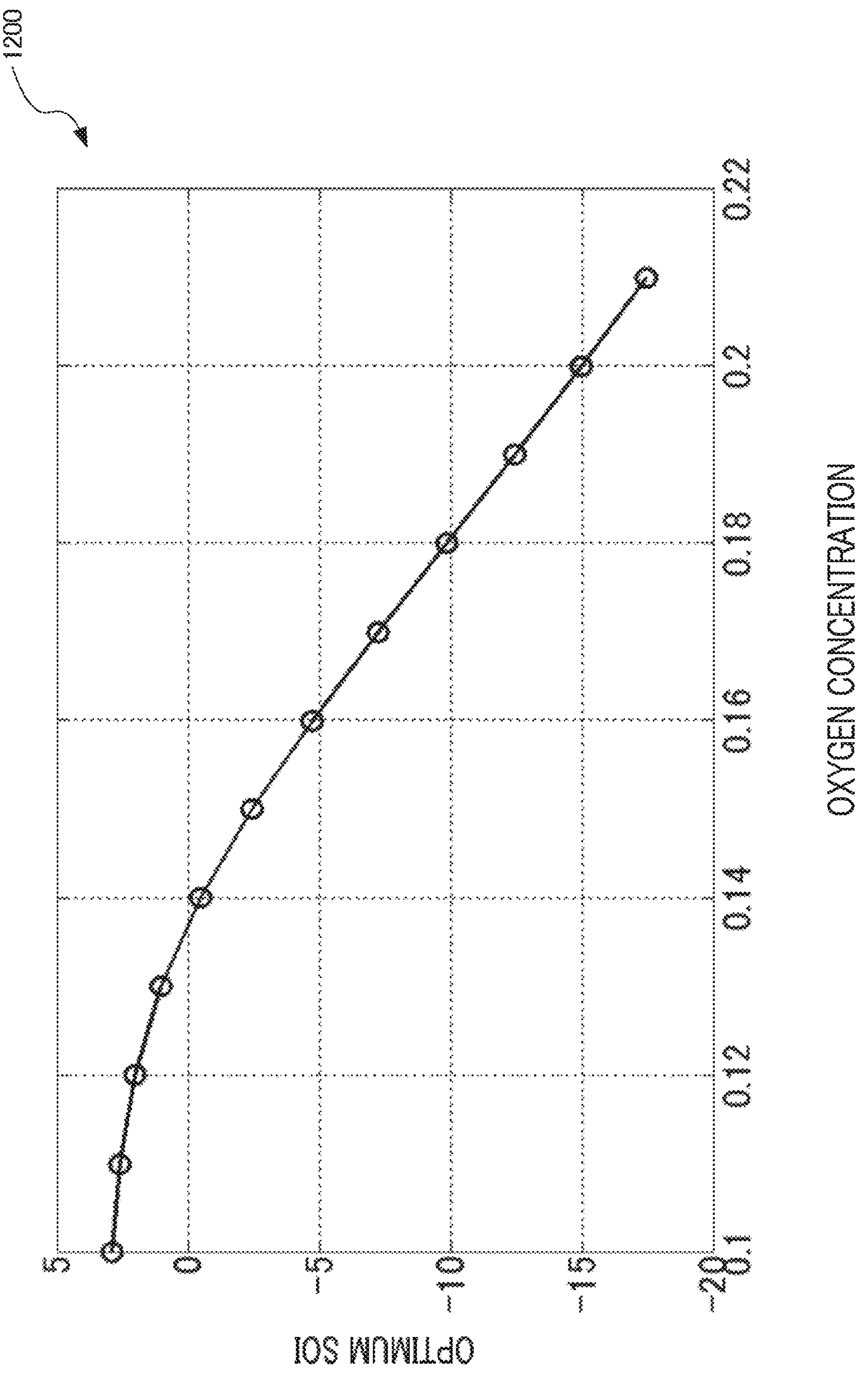
FIG. 6 is a diagram illustrating an example of intermediate SOI control information.

SOI control information generation section 56 generates SOI control information 120A by associating each set of the fuel injection amount and the engine speed with intermediate SOI control information 1200 of FIG. 6 corresponding to the set.

ECU 62 can identify one optimum SOI to one set of a fuel injection amount and an engine speed determined on the basis of information collected from various sensors, and oxygen concentration determined on the basis of information collected from intake oxygen concentration sensor 204, with reference to SOI control information 120A of interest.

Figure 8:
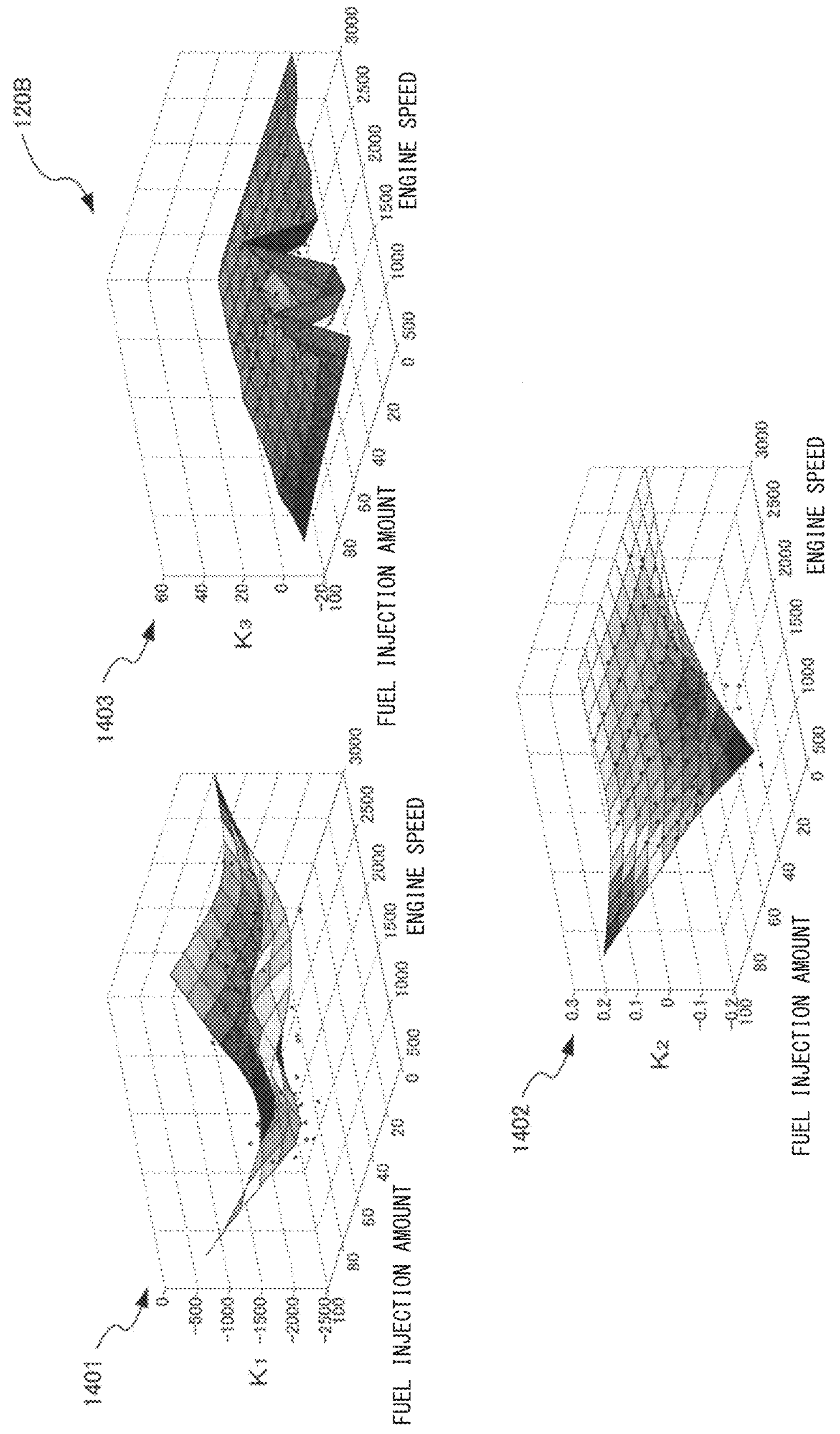
FIG. 8 is a diagram illustrating a modification of the SOI control information.

FIG. 8 is a diagram illustrating a modification of SOI control information 120.

SOI control information 120B is logic information (information of approximate expression) for calculating one optimum SOI value to the set of the fuel injection amount, the engine speed and the oxygen concentration, as illustrated in the following expression 5, and coefficient maps 1401, 1402 and 1403 of FIG. 8.

$$SOI_{opt}=K_1(\Psi_{O2}-K_2)^2+K_3$$

In expression 5, the "$SOI_{opt}$" denotes the optimum SOI value, the "$\Psi_{O2}$" denotes the oxygen concentration, the "$K_1$", "$K_2$", and "$K_3$" each denotes a coefficient determined according to the engine speed and the fuel injection amount, as illustrated by coefficient $K_1$ map 1401, coefficient $K_2$ map 1402, and coefficient $K_3$ map 1403.

SOI control information generation section 56 generates SOI control information 120B by associating coefficient $K_1$ map 1401, coefficient $K_2$ map 1402 and coefficient $K_3$ map 1403 with the respective sets of the fuel injection amount and the engine speed such that expression 5 is approximated to a function of intermediate SOI control information 1200 of FIG. 6.

ECU 62 identifies coefficient $K_1$, coefficient $K_2$, and coefficient $K_3$ to the set of the fuel injection amount and the engine speed determined on the basis of the information collected from the various sensors with reference to coefficient $K_1$ map 1401, coefficient $K_2$ map 1402, and coefficient $K_3$ map 1403.

ECU 62 substitutes oxygen concentration determined on the basis of the information collected from intake oxygen concentration sensor 204 in the "$\Psi_{O2}$" of expression 5, substitutes coefficient $K_1$, coefficient $K_2$ and coefficient $K_3$ identified above in the "$K_1$", "$K_2$", and "$K_3$" of expression 5, respectively, and calculates the $SOI_{opt}$ (optimum SOI).

With the above processes, ECU 62 can identify one optimum SOI to one set of oxygen concentration determined on the basis of the fuel injection amount and the engine speed determined on the basis of the information collected from various sensors, and the information collected from intake oxygen concentration sensor 204.

SOI control information 120A of FIG. 7 has a merit that accuracy of the optimum SOI is higher than SOI control information 120B of FIG. 8. SOI control information 120B of FIG. 8 has a merit that an data amount is smaller than SOI control information 120A of FIG. 7.

This SOI control information 120 is used when ECU 62 controls fuel injection. Now, this ECU 62 will be described.

Figure 9:
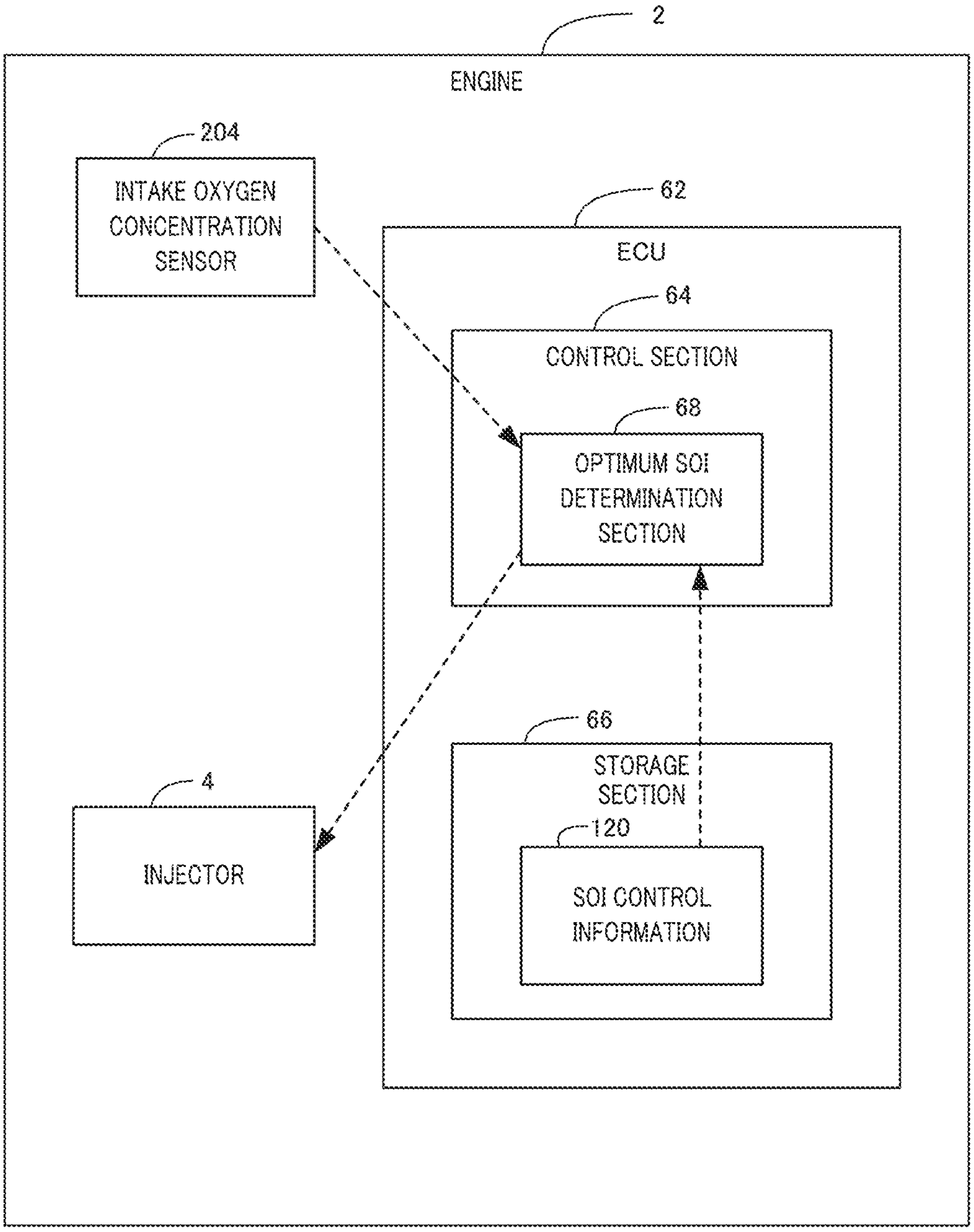
FIG. 9 is a diagram illustrating a configuration example of the ECU.

FIG. 9 is a diagram illustrating a configuration example of ECU 62.

ECU 62 includes control section 64 and storage section 66. Control section 64 is, for example, an LSI. Storage section 66 is, for example, a nonvolatile memory device.

Storage section 66 holds SOI control information 120 generated by SOI control information generation apparatus 50.

Control section 64 includes optimum fuel injection timing determination section (referred to as "optimum SOI determination section") 68. Optimum SOI determination section 68 determines an engine speed and a fuel injection amount on the basis of the information collected from various sensors. Additionally, optimum SOI determination section 68 recognizes oxygen concentration on the basis of the information collected from intake oxygen concentration sensor 204.

Optimum SOI determination section 68 determines optimum SOI to the determined engine speed and fuel injection amount, and the recognized oxygen concentration, on the basis of SOI control information 120 inside storage section 66.

Optimum SOI determination section 68 controls injectors 4 such that fuel is injected at the determined optimum SOI. Consequently, fuel is injected such that both increase in the NOx emission amount and deterioration of the fuel consumption rate are adequately suppressed.

Optimum SOI determination section 68 can identify optimum SOI at which both the increase in the NOx emission amount and the deterioration of the fuel consumption rate are adequately suppressed, even when either SOI control information 120A of FIG. 7 or SOI control information 120B of FIG. 8 is used.

SOI control information 120 generated on the basis of this embodiment is applicable in any running state. However, the SOI control information is more effectively applicable in an transition state in which speed change is large, for example, during acceleration or deceleration. Hereinafter, a reason thereof will be described with reference to FIG. 10.

Figure 10:
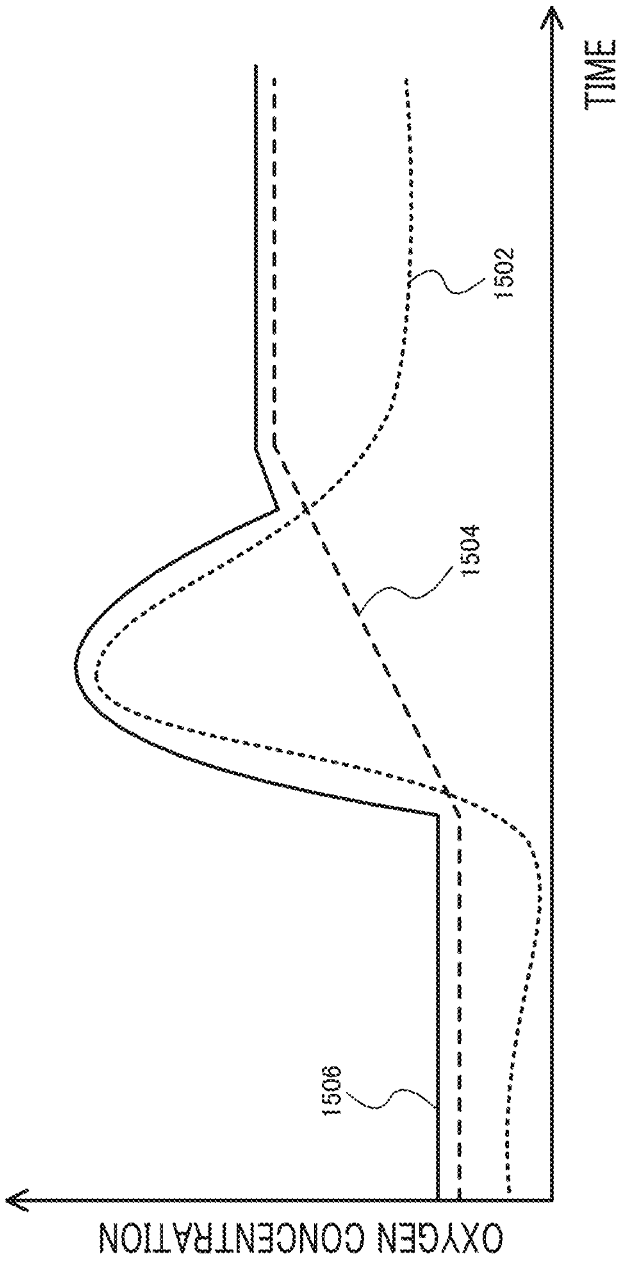
FIG. 10 is a diagram for illustrating SOI control at a transition time.

FIG. 10 is a diagram for illustrating SOI control in a transition state.

ECU 62 controls EGR valve 17 or SOI such that the oxygen concentration in each of cylinders 3 reaches oxygen concentration target value 1506 set near base target value 1504, in a steady state in which speed change is small, for example, during running at a constant speed. Base target value 1504 is oxygen concentration that implements a theoretical air-fuel ratio at a steady time.

ECU 62 forcibly closes EGR valve 17 to increase the oxygen concentration in each of cylinders 3, in the transition state. This is because in the transition state, the oxygen concentration in each of cylinders 3 tends to lower due to delay of increase response of an intake amount to increase response of a fuel injection amount, and when EGR valve 17 is not closed, soot or the like is generated due to incomplete combustion. Smoke Limit 1502 of FIG. 10 indicates a limit value thereof, and the oxygen concentration in each of cylinders 3 needs to be controlled to exceed Smoke Limit 1502 in order to prevent generation of soot or the like.

However, when EGR valve 17 is thus closed, the combustion temperature in each of cylinders 3 increases, and therefore the NOx emission amount increases. The SOI should be retarded in order to suppress increase of the combustion temperature in each of cylinders 3. However, as described above in FIG. 3, when the SOI is retarded, the fuel consumption rate is deteriorated.

That is, conventionally, it is unclear how much the SOI should be retarded in order to adequately suppress both the increase of the NOx emission amount and the deterioration of the fuel consumption rate. However, by using SOI control information 120 according to this embodiment, these can be adequately suppressed.

Only when ECU 62 detects the transition state, the SOI may be determined on the basis of SOI control information 120, and in a case in which the steady state is detected, the SOI may be determined by an existing method.

<Note>

The above embodiments are merely examples embodying the invention for implementing the present disclosure, and the technological scope should not be considered to be restrictive by them. That is, the present disclosure can be implemented in various forms without departing from the scope, or essential characteristics thereof.

The present application is based on a Japanese patent application (Japanese Patent Application No. 2016-235921) filed on Dec. 5, 2016, the contents of which is herein incorporated as a reference.

INDUSTRIAL APPLICABILITY

The present disclosure is usable for fuel control of a vehicle.

REFERENCE SIGNS LIST

2 Engine
3 Cylinder
4 Injector
50 Fuel injection control information generation apparatus
52 Control section
54 Storage section
56 Fuel injection control information generation section
62 ECU
64 Control section
66 Storage section
68 Optimum fuel injection timing determination section
100 Test point information
120, 120A, 120B Fuel injection control information
204 Intake oxygen concentration sensor
1200 Intermediate fuel injection control information
1401 Coefficient $K_1$ map
1402 Coefficient $K_2$ map
1403 Coefficient $K_3$ map

What is claimed is:

1. A fuel injection control information generation apparatus, comprising:

a test point information storage that holds test point information including a plurality of test points including an engine speed, a fuel injection amount, and oxygen concentration; and a control information generator generates, for each of the plurality of test points included in the test point information, fuel injection control information in which the engine speed, the fuel injection amount, and the oxygen concentration at the test point are associated with an optimum fuel injection timing at which an index pertaining to a total amount of a fuel consumption rate and an NOx emission amount at the test point reaches the smallest, wherein the fuel injection control information is map information in which the optimum fuel injection timing is associated with each of the plurality of test points, and wherein the optimum fuel injection timing is calculated by variable $SOI_{act}$ that satisfies expression, $$C \cdot \frac{dNOx}{dsoi_{act}} + (1 - C) \cdot \frac{dFC}{dsoi_{act}} = 0.$$

2. A control apparatus, comprising:

a control information storage that holds the fuel injection control information generated by the fuel injection control information generation apparatus according to claim 1; and a controller that controls a fuel injection timing of an internal-combustion engine on a basis of the fuel injection control information.

3. The control apparatus according to claim 2, wherein the controller controls the fuel injection timing of the internal-combustion engine on a basis of the fuel injection control information, only when an operating state of the internal-combustion engine is in a transition state.

4. The fuel injection control information generation apparatus, comprising:

a test point information storage that holds test point information including a plurality of test points including an engine speed, a fuel injection amount, and oxygen concentration; and a control information generator that generates, for each of the plurality of test points included in the test point information, fuel injection control information in which the engine speed, the fuel injection amount, and the oxygen concentration at the test point are associated with an optimum fuel injection timing at which an index pertaining to a total amount of a fuel consumption rate and an NOx emission amount at the test point reaches the smallest, wherein the fuel injection control information is logic information indicating an approximate expression for calculating the optimum fuel injection timing on a basis of the engine speed, the fuel injection amount and the oxygen concentration, the approximate expression being derived from correspondence relation between each of the plurality of test points and the optimum fuel injection timing, and wherein the optimum fuel injection timing is calculated by expression, $$SOI_{opt} = K_1(\Psi_{O2} - K_2)^2 + K_3.$$

5. A control apparatus, comprising:

a control information storage that holds the fuel injection control information generated by the fuel injection control information generation apparatus according to claim 4; and a controller that controls a fuel injection timing of an internal-combustion engine on a basis of the fuel injection control information.

6. The control apparatus according to claim 5, wherein the controller controls the fuel injection timing of the internal-combustion engine on a basis of the fuel injection control information, only when an operating state of the internal-combustion engine is in a transition state.

* * * * *